United States Patent [19]

Yuki

[11] 3,730,536

[45] May 1, 1973

[54] PICKUP ARM DEVICE FOR CANCELING BIASING FORCES OF STYLUS

[75] Inventor: Yoshiyuki Yuki, Hamamatsu, Japan

[73] Assignee: Nippon Gakki Seizo Kabushiki Kaisha, Hamamatsu-shi, Shizuoka-ken, Japan

[22] Filed: Dec. 28, 1971

[21] Appl. No.: 213,024

[52] U.S. Cl. ................................274/23 R, 274/15 R
[51] Int. Cl. ..............................G11d 3/12, G11d 3/28
[58] Field of Search ............................274/23 R, 15 R

[56] References Cited

UNITED STATES PATENTS

| | | | |
|---|---|---|---|
| 2,488,260 | 11/1949 | Ascoli | 274/15 R |
| 3,315,967 | 4/1967 | Laufer | 274/23 R |
| 3,502,341 | 3/1970 | Lane | 274/23 R |

*Primary Examiner*—Harry N. Haroian
*Attorney*—David H. Semmes

[57] ABSTRACT

A mechanism for cancelling a force resulting from a rotating disk record and acting on a pickup arm stylus, during sound reproduction, in a direction from the peripheral portion of the record toward the center thereof comprises a coiled spring imparting a counterbalancing force to the stylus to cancel the former force. The mechanism of the invention further includes a pivoted lever permitting the spring force to act on the arm during sound reproduction and releasing the counterbalancing force thereof until the start, and right after the end, of record playing, whereby the stylus can be set down into the lead-in groove of the disk record or lifted up from the final portion of the record groove in the right vertical direction.

3 Claims, 5 Drawing Figures

INVENTOR

Yoshiyuki Yuki

BY David H. Semmes

ATTORNEY

PICKUP ARM DEVICE FOR CANCELING BIASING FORCES OF STYLUS

This invention relates to an improvement in the pickup arm device of a stereophonic record player which has a mechanism for cancelling a force acting, during sound reproduction, on the pickup head or stylus in a direction from the peripheral portion of a rotating disk record toward the center thereof.

Further the invention relates to the pickup device of a stereophonic or a stereo record player in which the pickup head of the equipment can be lowered to or raised from the surface of a phonograph disk record in the right vertical direction.

In the playing of a phonograph record, the stylus, or the pickup head travels diametrically across the record disk in a closely spaced spiral pattern of a continuous groove on the surface. In order for the pickup head to trace properly the groove on the record disk, it is necessary to give the tone arm a relatively large overhang. However, when the overhang of the tone arm is enlarged, a force becomes to act on the pickup arm or head during record playing, causing the head to tend to move in a direction from the peripheral portion of a rotating disk record toward the center thereof, that is, in an inward direction of the disk record, and this inwardly acting force is one of the main causes of the distortion of the reproduced stereophonic sounds. Accordingly, in order to compensate this force given to the pickup head or stylus, the tone arm is usually provided with a mechanism for cancellation of such force. That is, for example, the prior-art tone arm is fitted with a coiled spring, which is stretched between the root portion of the pivoted arm and the stationary part of the record player, so that the spring acts to counterbalance the aforesaid force.

However, in such equipment having the inwardly acting force canceller mechanism, the spring action is always imparted to the tone arm, that is, the force cancelling action is given even when the tone arm is in the position of lead in (cueing) or automatic return, where the compensation force is not necessary. And therefore, the pickup head cannot be lowered vertically to the surface of the disk or not be raised vertically from the surface of the disk. The inclined motion of the pickup head in the lowering to or raising from the surface of the disk is harmful for both the disk and the stylus because it causes incorrect lead in, scratches and so forth. Accordingly, when the pickup is placed on the disk or raised from the disk, the above-mentioned cancellation mechanism is unnecessary, or rather obstructive, in order to move the pickup head vertically to or from the surface of the disk.

Therefore, the object of the present invention is to propose a device by which the inwardly acting force canceller for the pickup system of the stereo record player can be released when the pickup is led in or raised from the surface of the disk, meanwhile during the playing of the disk, the inwardly acting force canceller mechanism is worked in like manner as those in the ordinary equipments.

Further object of the present invention is to propose a pickup device for a stereo record player by which the pickup head of the device can be lowered to or raised from the surface of a disk smoothly and correctly.

Still further, the object of the invention is to propose a pickup device for a stereo record player to carry out the above objects in which the structure of said device is relatively simple and the working of the device is reliable.

Pursuant to the foregoing objects of the invention, the pickup arm device for phonograph record players reproducing sound from a phonograph record comprises a pickup arm pivotally mounted on a support, a lever movable to and away from the pickup arm, a spring stretched between the arm and the lever in a tensed state, and means for moving the lever to and away from the arm to obtain and release the tensed state of the spring.

Various further and more specific objects, features and advantages of the invention will appear from the following description taken in connection with the accompanying drawings illustrating by way of examples of this invention, in which:

FIG. 2(*b*) is a front elevation of the pickup head showing the direction of the movement thereof in the return step of the ordinary equipment;

Figures 1, 2, 3:
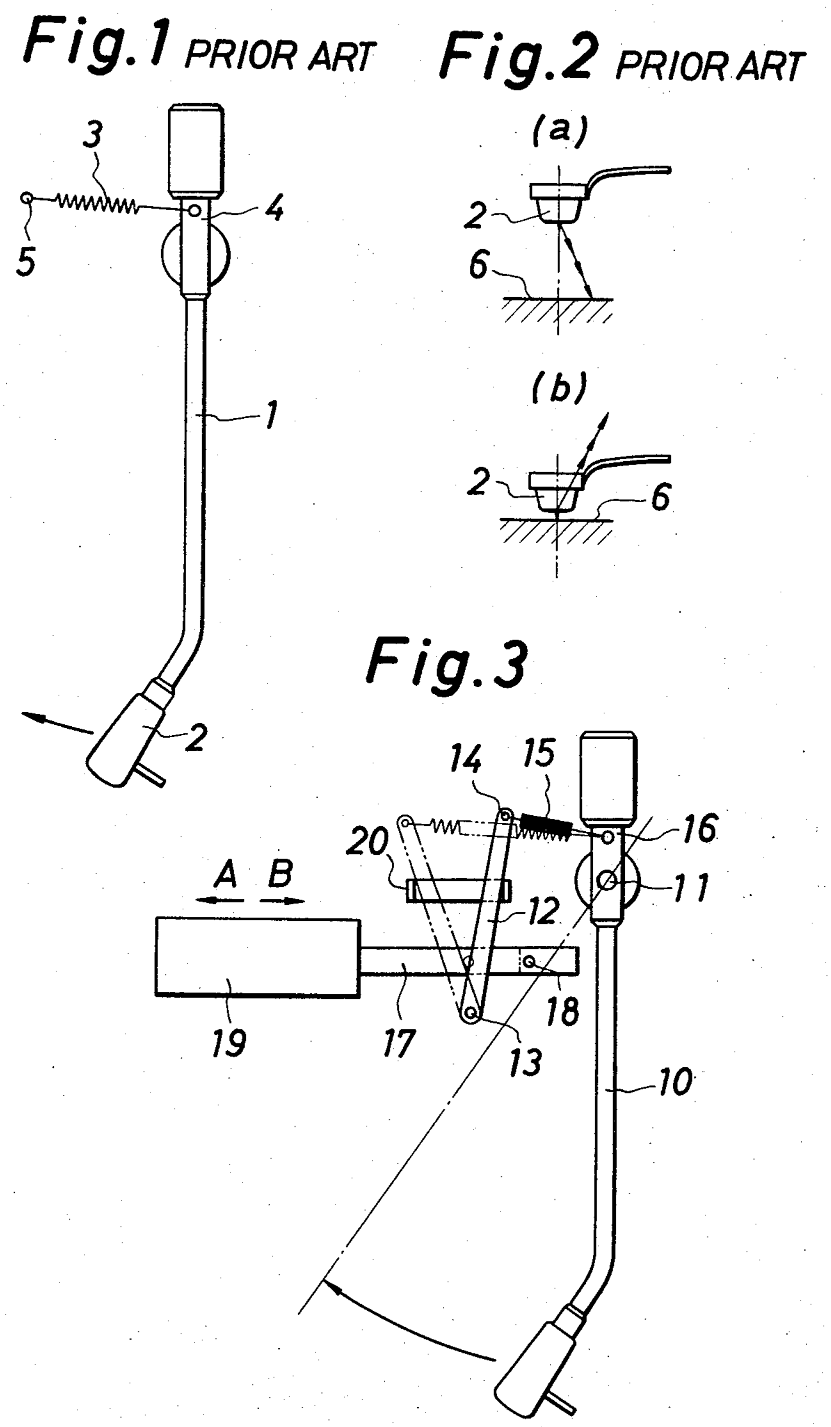
Fig.1 PRIOR ART, Fig.2 PRIOR ART, Fig.3
FIG. 1 is a plan view of the essential parts of a pickup arm device having an inwardly acting force canceller mechanism in the prior art.
FIG. 2(*a*) is a front elevation of the pickup head showing the direction of the movement thereof in the lead-in step of the ordinary equipment.
FIG. 3 is a plan view of an embodiment of this invention.

Now referring to FIG. 1, there is shown a pickup device with an inwardly acting force canceller spring. In the rotation of a disk during sound reproduction, a tone arm 1 having a pickup head 2 is imparted with a force acting on the tone arm 1 so as to cause the pickup head 2 to tend to move in an inward direction of a disk record, i.e., in a direction from the peripheral portion of the disk record toward the center thereof, in accordance with the travelling of the stylus of the pickup head 2 through the groove on the disk, and therefore the pickup head 2 is biased to some extent against the left side wall of the groove as shown by an arrow. Accordingly the reproduced sound from the right side wall of the groove is liable to cause distortion. Therefore, in order for the pickup head 2 to trace properly the groove on the disk, some cancelling force is to be imparted to the pickup head 2. Hence a coiled spring 3 is stretched between the root portion 4 of the tone arm 1 and a fixed point 5 in order to cancel the above-mentioned inwardly acting force.

While, in the ordinary art, said spring 3 acts always on the tone arm 1, therefore when the pickup head 2 is lowered to the lead-in groove of the disk 6 in the start of playing, the pickup head 2 goes obliquely to the surface of the disk 6 as shown by the arrow in FIG. 2(*a*). While, as indicated by the arrow in FIG. 2(*b*), when the pickup head 2 is raised from the disk 6 in the return step, the pickup head 2 rises obliquely from the surface of the disk 6. Therefore, the movement of the pickup becomes inaccurate which causes the inaccurate lead-in, scratching of the disk surface or other troubles.

Figure 4:
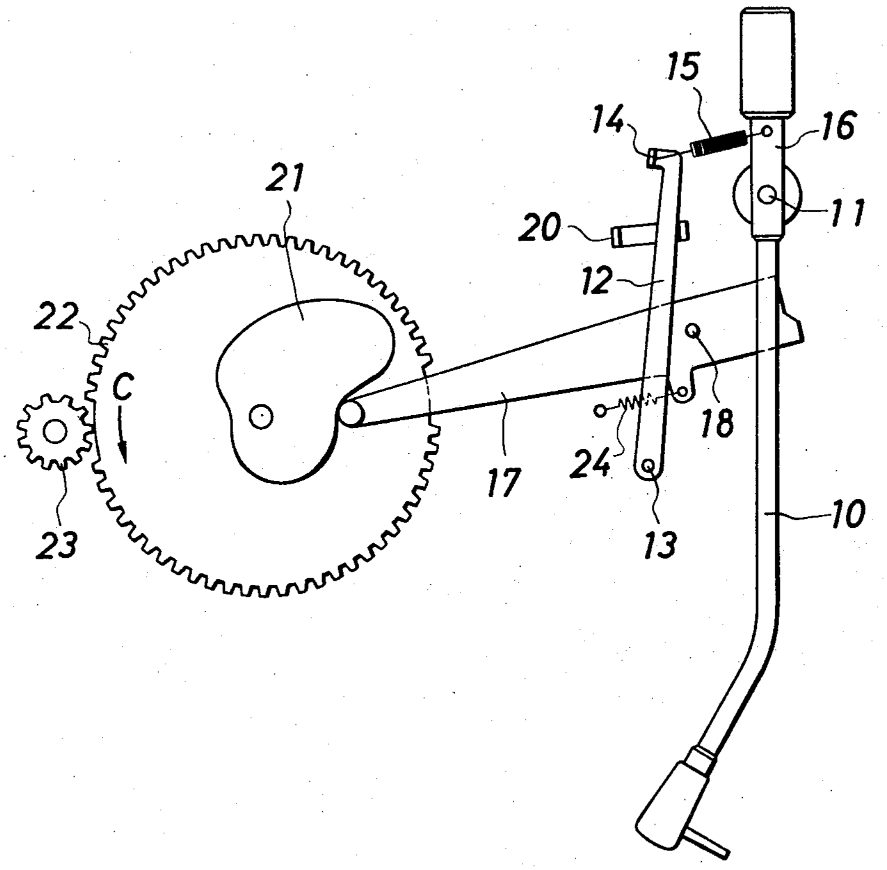
FIG. 4 is a plan view of another embodiment of the invention in which the action of the inwardly acting force canceller is not worked.
Figure 5:
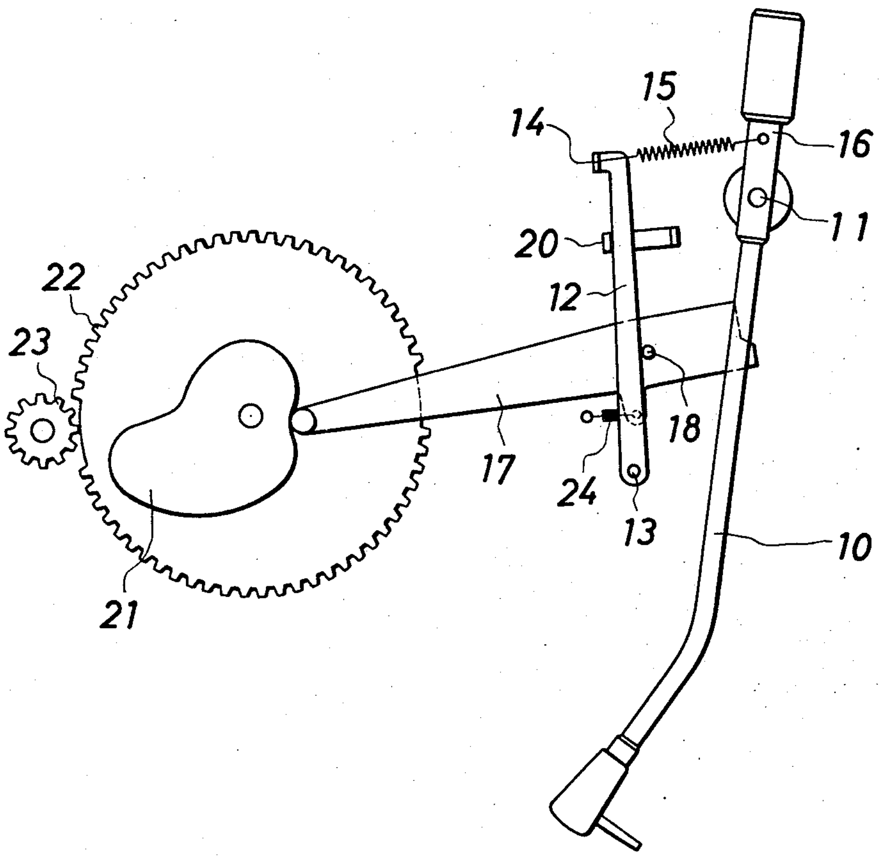
FIG. 5 is a plan view of the embodiment as shown in FIG. 4, in which the action of the canceller is imparted to the pickup head.

These disadvantages can be cleared up by the devices of the present invention as shown in FIGS. 3 to 5. In FIG. 3, a tone arm 10 is rotatably supported about a pivot 11, and a lever 12 is positioned on the inside of the tone arm 10. The lever 12 is swingably fitted to the motor board (not shown) of the player by a pin 13 and the free end 14 of the lever 12 is provided with a coiled spring 15, the other end of which is connected to the root portion 16 of the tone arm 10. In the state as shown by the solid lines, the spring 15 is not worked, and when the lever 12 is swung to the position as indicated by the imaginary lines, the spring is stretched in the tensed state with the action of the spring 15 imparted to the root portion 16 of the tone arm 10. Thus the tone arm 10 is given a counterbalancing force which cancels the above-mentioned inwardly directed force. A sliding member 17 is further provided extending transversely to the lever 12 and having a pin 18. The sliding member 17 is movable in the lengthwise direction thereof and is reciprocated by an operation mechanism 19 which is interconnected to the lead-in and autoreturn mechanism (not shown) for the pickup body. In case the sliding member 17 is moved to the left hand direction as indicated by an arrow A, the lever 12 is pushed by the pin 18 and is inclined to the left side to impart the spring action on the root portion 16 of the tone arm 10, whereby the inwardly directed force acting on the pickup arm 10 during sound reproduction can be cancelled or compensated. A stopper 20 is provided to limit the movement of the lever 12.

The above-described arrangement will be explained further in order of the record playing operations.

In the first step, the pickup head is moved just above the lead-in groove on the periphery of the disk record, then the pickup head of the tone arm 10 is lowered by a well-known arm lowering mechanism (not shown), and at the same time the sliding member 17 which is interconnected with the arm lowering mechanism is moved to the left-hand direction until the pin 18 on the sliding member 17 comes into contact with the lever 12. During this step, the inwardly directed force cancelling action by the spring 15 is not yet imparted to the root portion 16 of the tone arm 10, because the lever 12 is not completely pushed to the limit by the pin 18 of the sliding member. Thereafter, the stylus of the pickup head is set down into the groove of the record and the reproduction of the sound is started, at the same time the sliding member 17 which is interconnected with the arm lowering mechanism being further moved to the left hand direction and the lever 12 being also pushed by the pin 18 of the sliding member 17 to the movable limit thereof as indicated by the imaginary lines in FIG. 3, whereby the spring 15 is pulled by the free end 14 of the lever 12 to impart the inwardly directed force cancelling action to the root portion 16 of the tone arm 10.

After the end of reproduction, when the pickup head is shifted to the innermost turn of the disk groove, the operation mechanism begins to move in the right hand direction indicated by an arrow B, and the sliding member 17 is simultaneously moved to the right hand direction by the interconnected operation mechanism 19, and the lever 12 which is in contact with the pin 18 is also sent back to the right hand direction until it is stopped by the stopper 20. Accordingly, the inwardly directed force canceller action by the spring 15 is released. Then an automatic return mechanism (not shown) interconnected with the further right hand movement of the mechanism 19 is started to lift up the pickup head of the tone arm 10 and return it to the original position on the arm rest.

The other embodiment as shown in FIGS. 4 and 5 has also a slide mechanism which is interconnected with an arm lowering and lifting and automatic return mechanism. FIG. 4 shows a state wherein the inwardly directed force canceller mechanism is released and the disk is stopped. The device of this invention is built in and interconnected with the ordinarily known operation mechanism of the tone arm, and for the purpose of simplifying and clarifying the explanations of the device of this invention, such known mechanism is not shown in the drawings. The sliding member 17 of this embodiment is moved by a cam 21 which is fitted on one side of a control gear wheel 22 as a part of the tone arm operation mechanism. For the start of the reproduction of a disk, a pinion 23 which is fixed to the turn table shaft is rotated by a phonomotor and after the setting down of the stylus into the lead-in groove, the pinion 23 is engaged with the teeth of the gear wheel 22 by means of the operation mechanism of the arm 10, whereby the gear wheel 22 with the cam 21 is rotated in a direction indicated by an arrow C for 180° and they result in a state as shown in FIG. 5, where the gear engagement between the gears 22 and 23 is disengaged again. While, the sliding member 17 is pulled by a spring 24 in a left hand direction, accordingly the sliding member 17 is moved to the left hand side and the pin 18 on the member 17 pushes the lever 12. Thereby, the lever 12 is inclined to the left hand direction and the free end 14 of the lever 12 pulls the spring 15 to impart a pulling force to the root portion 16 of the tone arm 10 during the playing of the disk. Further, when the pickup head is shifted to the innermost turn of the groove of the disk after the playing, the pinion 23 is again engaged with the gear wheel 22 by means of a known automatic return mechanism, and the wheel 22 is rotated for 180° along with the cam 21, whereby the sliding member 17 is pushed back again by the cam 21 to release the action of the spring 15. With the sliding member 17 further moved in a right hand direction, the tone arm 10 is lifted up and returned by the automatic operation mechanism.

As disclosed in the above, the pickup arm device of the present invention gives the tone arm a counterbalancing force cancelling the inwardly directed force resulting from a rotating record and acting on the stylus, only when the record is played, and before and after the playing of the record, the counterbalancing force is not imparted to the tone arm, and therefore the pickup head of the tone arm can be lowered to or raised from the surface of the record in the right vertical direction without moving in any oblique direction. Accordingly, by using the device of the present invention, the smooth and exact lead-in and autoreturn of the pickup head can be expected, especially when the pickup head is lowered into the lead-in groove on the peripheral surface of the record, enabling the lead-in error to be perfectly prevented.

While the principles of the invention have been described above in connection with the specific embodiments, it is to be clearly understood that this description is made only by way of example and not as a limitation on the scope of invention.

What is claimed is:

1. A pickup arm device for phonograph record players reproducing sound from a rotating phonograph record with a groove comprising a pickup arm pivotally mounted on a support, said arm having a stylus attached at one end portion thereof, the stylus being traceably engaged into the groove of the record for sound reproduction and being subjected to a biasing force by the rotating phonograph record, a lever supported movable to and away from said pickup arm, a spring stretched between said pickup arm and said lever in a tensed state, and means for moving said lever to and away from said pickup arm to obtain and release the tensed state of said spring, the tension of said spring counterbalancing the biasing force to which the stylus is subjected.

2. A pickup arm device as claimed in claim 1 wherein said lever is pivoted at one end portion thereof and is provided with said spring at the other end thereof, and said means is extended transversely to said lever and is provided with a member engageable with said lever to move said lever to and away from said pickup arm.

3. A pickup arm device as claimed in claim 2 wherein said engageable member is a pin projecting from said means.

* * * * *